(12) United States Patent
Fournier et al.

(10) Patent No.: US 6,261,503 B1
(45) Date of Patent: Jul. 17, 2001

(54) PROCESS FOR PROTECTION AGAINST CORROSION BY CHEMICAL PRODUCTS, OF FLEXIBLE SELF-DEMOULDING SILICONE MEMBRANES

(75) Inventors: Alain Fournier, Saint Lys; Christophe Aumont, Plaisance du Touch, both of (FR)

(73) Assignee: Aerospatiale Matra Airbus, Paris Cedex (FR)

( * ) Notice: Subject to any disclaimer, the term of this patent is extended or adjusted under 35 U.S.C. 154(b) by 0 days.

(21) Appl. No.: 09/560,335

(22) Filed: Apr. 28, 2000

(30) Foreign Application Priority Data

Apr. 28, 1999 (FR) .................................................. 99 05564

(51) Int. Cl.$^7$ ........................... B29C 33/64; B29C 39/02; B29C 39/26
(52) U.S. Cl. ...................... 264/316; 264/331.11; 264/338
(58) Field of Search ..................................... 264/313, 316, 264/330, 331.22, 338; 156/247

(56) References Cited

U.S. PATENT DOCUMENTS

| | | | |
|---|---|---|---|
| 4,200,706 | * | 4/1980 | Starks . |
| 4,270,964 | * | 6/1981 | Flaskett . |
| 4,740,535 | * | 4/1988 | Iyer et al. . |
| 5,243,015 | * | 9/1993 | Hutchings et al. . |
| 5,344,909 | | 9/1994 | Hutchings et al. . |

FOREIGN PATENT DOCUMENTS 384 800 A1   8/1990   (EP) .

OTHER PUBLICATIONS

Abstract of Japan 57–72750 (May 7, 1982).*
Abstract of Japan 59–172541 (Sep. 29, 1984).*

* cited by examiner

Primary Examiner—Leo B. Tentoni
(74) Attorney, Agent, or Firm—Young & Thompson

(57) ABSTRACT

A process for the production of a resin piece by molding, places a self-demolding silicone membrane in a mold, and adds a catalyst to the resin to reduce the polymerization time of the resin so that the resin will not corrode the membrane.

6 Claims, No Drawings

PROCESS FOR PROTECTION AGAINST CORROSION BY CHEMICAL PRODUCTS, OF FLEXIBLE SELF-DEMOULDING SILICONE MEMBRANES

BACKGROUND OF THE INVENTION

The present invention relates to a process for the protection of flexible bi-constituent silicone membranes, more particularly flexible self-demoulding silicone membranes, particularly in the case of use in moulding by resin transfer.

A bi-constituent silicone has the following general formula when it is obtained by poly addition:

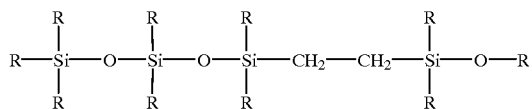

Resin transfer moulding consists in preparing forms having confronting surfaces generating a volume of the shape of the piece to be made, placing on the walls of this volume a flexible silicone membrane to permit demoulding the finished piece, and injecting into the space delimited by said membrane, resin and its polymerization catalyst. The mould walls can be heated so as better to control the polymerization reaction.

This process is widely used in the automotive industry and in the field of sports and leisure. This process permits obtaining better technical performances, reducing the production cycles.

Initially used only for small-size pieces, this process tends to be more widespread and to find applications including the production of structures of large size, as in the aeronautical field.

Moreover, the injected resins are of the phenolic type and have particularly interesting advantages in this aeronautical field, because they are self-extinguishing and the fumes given off, of small volume, are not harmful.

Each resin is sold with its catalyst and there is more particularly known one among others which contains para-toluene sulfonic acid.

This catalyst is well known for this property as to certain resins but it has on the other hand drawbacks as to health, because it is an irritating acid but above all it can become noxious at the temperatures at which it is used, in addition to being costly.

The flexible self-demoulding silicone membrane itself has numerous qualities which are essential for the good practice of the process. There is no machining, it is easy to demould because one need only pull on the membrane to peel it relative to the piece, and the surface condition of the obtained piece is excellent.

On the other hand, this membrane has an important drawback: in contact with the resin, and more particularly the phenol groups, the membrane corrodes. This corrosion has the effect of degrading the condition of the surface and this phenomenon becomes progressively more marked upon successive uses.

This premature aging causes the membrane to lose all its demoulding qualities and accordingly leads to a decrease of the quality of the surface condition of the piece. This fact requires the user to replace the membrane frequently, which replacement decreases the profitability of the process of resin transfer moulding.

SUMMARY OF THE INVENTION

The object of the invention is to provide a process for the production of a piece with a self-demoulding silicone membrane permitting avoiding premature degradation and thereby increasing the potential for use. This process must permit preserving the demoulding qualities, the good condition of the surface of the produced piece, which two generally go together, while avoiding substantially increasing the thicknesses.

To this end, the invention relates to a process for the production of a resin piece particularly by moulding with the aid of a self-demoulding silicone membrane, at least one of said resins comprising groups susceptible to have damaging action on said membrane, particularly corrosion, which process is characterized in that the time of polymerization of said resin is reduced such that it polymerizes rapidly after its introduction into the mould to block the action of said groups.

In the case of at least one resin comprising phenol groups, the catalyst is selected from the family of sulfonic acids and is methane sulfonic acid.

The quantity of catalyst used is of the order of one part by weight per 100 parts by weight of resin.

The solvent used is aqueous and the working temperature is below 95° C.

DETAILED DESCRIPTION OF THE PREFERRED EMBODIMENTS

The present invention will now be described in detail.

It will be noted that one of the possible explanations of this corrosion could be the action of the phenol groups of the resin on one of the molecules of the flexible silicone membrane.

The simplified chemical equation of such a reaction can be written in the following manner:

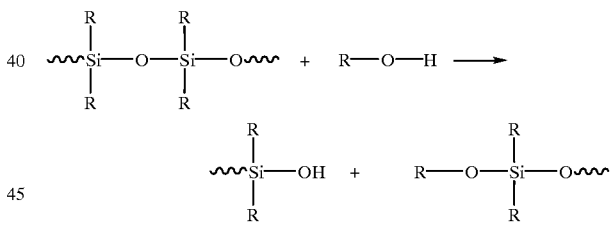

Note the rupture of the silicone chain which marks the degradation of the flexible membrane in the course of time, because the action is not immediate.

The acid catalyst permits triggering the degradation by breaking the chain of the silicone groups, and unfortunately it accelerates the degradation of the membranes during the time of polymerization of the phenolic resin.

Thus, the corrosion process is a maximum when the resin is still liquid because the phenol groups can diffuse to the surface of the membrane.

There will thus be noted a great decrease of the demoulding capability of the membrane which becomes, progressively with use, more and more difficult to unstick from the piece, which gives rise simultaneously to degradation of the surface condition of said piece.

The degradation begins in limited regions and propagates rapidly over all the surface of the membrane.

Statistics show that these membranes can be used about a dozen times.

A first solution consists in overcoming the aggressive power of the alcohol (phenol) by replacing it but there have been enumerated above the good reasons why the industry uses phenolic resins, more particularly in aeronautics.

Another solution consists in arranging a barrier product on the membrane to avoid this aggression, as is described in French patent application No. 99 02382 in the name of the same applicant.

Another way consists in decreasing the aggressive power of the catalyst, but the results obtained have been less promising and the possibilities of modification are relatively reduced, because it is necessary to maintain its principal qualities of initiating and carrying out the polymerization reaction.

The solution according to the present invention consists in decreasing the contact time of the monomer and of its catalyst with the membrane. Thus, the reaction being blocked very rapidly, the action of the phenol (alcohol) groups is very quickly neutralized. Moreover, by decreasing the cycle time, the number of these cycles can be increased and the production time decreased.

To this end, the production process proposes using a catalyst whose polymerization speed in contact with the phenolic resins is greater than that of para-toluene sulfonic acid.

Thus in the family of sulfonic acids, a particular suitable one is methane sulfonic acid, which is surprisingly a very judicious selection. This acid is sold for example under the name AMS 2690 by the Elf Atochem company. This acid permits accelerating considerably the polymerization reaction, which decreases the contact time of the free phenol groups in the phenolic resins, with the self-demoulding silicone membrane.

This catalyst, as sold, moreover can give rise to a too rapid reaction, under certain circumstances, which can interfere with filling the bowls by the resins and which would argue against its use. It is thus necessary to adjust the quantity of catalyst to obtain the desired results without interfering with the good filling of the moulds.

Such a catalyst also has the advantage of not being toxic to the users at the temperature of use, and it is much less costly, which permits gains in the final product.

Methane sulfonic acid is also advantageous because its solvent is aqueous and can simply be water. Moreover, it is known that this solvent is less costly. Furthermore, it has a boiling temperature which is fairly high, so as not to vaporize during the exothermic polymerization reaction, even at maximum exotherm.

It is also known that phenolic resin contains water, which accounts for this compatibility.

By dilution, the kinetic of the polymerization reaction can thus be controlled. Dilution also permits carrying out a good homogenization of the mixture before introduction into the mold, which avoids irregularities.

A good proportion of catalyst is 1 part by weight of catalyst per 100 parts by weight of the mixture of resins.

The production temperature of the pieces is generally comprised between 60 and 95° C., which is quite compatible with the use of the catalyst selected from the family of sulfonic acids. Thus, the boiling point is beyond that which avoids emissions and the chemical decomposition of this product. It will be noted that these thresholds are given only by way of indication and the low limit can be lowered to 40° C. under other conditions of use.

The dilution must be carried out within two end limits:

the lower limit is an absence of dilution because the reaction is quasi-instantaneous, and hence too rapid and it can lead to plugging the openings of the bowl, and too great a dilution may form microbubbles in the course of the temperature rise engendered by the polymerization reaction. Moreover, excess water can play a plastifying role in the structure of the resin.

It is known that the use of resin transfer moulding is costly because this latter requires large investments such as injection machines provided with heating means, working stations, heating equipment, permanent equipment such as metallic shapes and renewable tools such as counterforms which are the flexible self-demoulding silicone membranes.

It is thus very interesting to be able to preserve the membranes for a greater number of possible successive uses by limiting the effects of corrosion, having recourse to the process which consists in decreasing the duration of the corrosion action.

What is claimed is:

1. A process for the production of a resin piece by molding, comprising:

placing a self-demolding silicone membrane in a mold;

selecting at least one resin having a corrosive effect on said membrane;

adding a catalyst to said at least one resin to reduce a polymerization time of said at least one resin; and adding said at least one resin and said catalyst to said mold, said reduced polymerization time preventing corrosion of said membrane.

2. The process according to claim 1, wherein said catalyst is methane sulfonic acid and said at least one resin is a phenolic resin.

3. The process according to claim 2, wherein a quantity of said catalyst is about 1 part by weight for 100 parts by weight of resin.

4. The process according to claim 3, further comprising dissolving said catalyst in an aqueous solvent.

5. The process according to claim 1, wherein a working temperature is below 95° C.

6. A process for the production of a resin piece by molding, comprising:

arranging a self-demolding silicone membrane within a mold;

introducing polymerizable resin containing phenol groups, and a methane sulfonic acid catalyst, into said mold; and conducting a polymerization reaction of the resin in the mold under the influence of said catalyst to reduce polymerization time and prevent corrosion of said membrane.

* * * * *